US008325764B2

(12) United States Patent
Frink et al.

(10) Patent No.: US 8,325,764 B2
(45) Date of Patent: Dec. 4, 2012

(54) CANONICAL SCHEDULING FOR HETEROGENEOUS CONTENT DELIVERY

(75) Inventors: Craig Frink, Chelmsford, MA (US); Santosh Krishnan, Windham, NH (US); Weidong Xu, Westford, MA (US); Qin-Fan Zhu, Acton, MA (US)

(73) Assignee: Verivue, Inc., Westford, MA (US)

( * ) Notice: Subject to any disclaimer, the term of this patent is extended or adjusted under 35 U.S.C. 154(b) by 222 days.

(21) Appl. No.: 12/391,975

(22) Filed: Feb. 24, 2009

(65) Prior Publication Data

US 2010/0215057 A1 Aug. 26, 2010

(51) Int. Cl.
*H04J 3/24* (2006.01)
(52) U.S. Cl. ........ 370/474; 370/392; 370/412; 370/465; 386/211; 725/90
(58) Field of Classification Search .................. 370/252, 370/412, 473, 514, 392, 276, 240.25, 474, 370/465; 725/90; 713/173; 386/211
See application file for complete search history.

(56) References Cited

U.S. PATENT DOCUMENTS

| | | | |
|---|---|---|---|
| 5,499,046 A | | 3/1996 | Schiller et al. |
| 5,537,408 A | * | 7/1996 | Branstad et al. ............. 370/473 |
| 5,550,577 A | | 8/1996 | Verbiest et al. |
| 5,566,174 A | * | 10/1996 | Sato et al. .................... 370/468 |
| 5,594,490 A | | 1/1997 | Dawson et al. |
| 5,668,601 A | * | 9/1997 | Okada et al. ............. 375/240.25 |
| 5,805,804 A | | 9/1998 | Laursen et al. |
| 5,867,230 A | | 2/1999 | Wang et al. |
| 5,878,220 A | | 3/1999 | Olkin et al. |
| 5,930,450 A | * | 7/1999 | Fujita ............................ 386/241 |
| 5,956,729 A | | 9/1999 | Goetz et al. |
| 5,974,053 A | | 10/1999 | Bennett et al. |
| 6,055,577 A | | 4/2000 | Lee et al. |
| 6,292,490 B1 | | 9/2001 | Gratacap et al. |
| 6,744,782 B1 | * | 6/2004 | Itakura et al. ................. 370/466 |
| 6,937,770 B1 | | 8/2005 | Oguz et al. |

(Continued)

FOREIGN PATENT DOCUMENTS

CA 2 466 458 12/2004

(Continued)

OTHER PUBLICATIONS

ISO/IEC 13818-1: ITU-T Recommendation H.222.0: Series H: Audiovisual and Multimedia Systems: Infrastructure of Audiovisual Services—Transmission Multiplexing and Synchronization; Information Technology—Generic Coding of Moving Pictures and Associated Audio Information Systems: 1-171, May 27, 1999.

(Continued)

*Primary Examiner* — Michael Thier
*Assistant Examiner* — Vincelas Louis
(74) *Attorney, Agent, or Firm* — Proskauer Rose LLP

(57) ABSTRACT

Described are computer-based methods and apparatuses, including computer program products, for canonical scheduling for heterogeneous content delivery. A content stream of bits is preprocessed by dividing the content stream of bits into data packets and assigning a timestamp to each data packet. The preprocessed content stream of bits is transmitted upon request from a receiver. A second timestamp based on the assigned timestamp from at least a portion of the respective data packets is established. The data packets are scheduled for transmission based on the second timestamp. The data packets are transmitted based on the schedule.

26 Claims, 12 Drawing Sheets

U.S. PATENT DOCUMENTS

| | | |
|---|---|---|
| 6,971,119 B1 | 11/2005 | Arsenault et al. |
| 7,080,400 B1 | 7/2006 | Navar |
| 7,130,368 B1* | 10/2006 | Aweya et al. ............... 375/376 |
| 7,561,515 B2 | 7/2009 | Ross |
| 2001/0009548 A1* | 7/2001 | Morris ....................... 370/392 |
| 2002/0019984 A1 | 2/2002 | Rakib |
| 2002/0080802 A1* | 6/2002 | Sachs et al. ............... 370/401 |
| 2003/0208765 A1 | 11/2003 | Urdang et al. |
| 2004/0160971 A1* | 8/2004 | Krause et al. ............. 370/412 |
| 2004/0170198 A1* | 9/2004 | Meggers et al. ........... 370/514 |
| 2004/0218617 A1 | 11/2004 | Sagfors |
| 2005/0111836 A1* | 5/2005 | Kato ........................ 386/111 |
| 2005/0188099 A1 | 8/2005 | Patel |
| 2006/0165088 A1 | 7/2006 | Monta et al. |
| 2006/0227813 A1* | 10/2006 | Mavrogeanes ............. 370/509 |
| 2006/0230176 A1 | 10/2006 | Dacosta |
| 2007/0070895 A1 | 3/2007 | Narvaez |
| 2007/0116039 A1* | 5/2007 | Gavagni et al. ............ 370/465 |
| 2008/0270800 A1* | 10/2008 | Krober et al. .............. 713/178 |
| 2008/0304571 A1* | 12/2008 | Tsukagoshi et al. ..... 375/240.25 |
| 2009/0180534 A1 | 7/2009 | Hluchyj et al. |
| 2010/0011397 A1* | 1/2010 | Baran et al. ............... 725/90 |
| 2010/0131992 A1* | 5/2010 | Kenmotsu et al. .......... 725/90 |

FOREIGN PATENT DOCUMENTS

| | | |
|---|---|---|
| EP | 1 675 399 | 6/2006 |
| EP | 1 791 040 | 5/2007 |

OTHER PUBLICATIONS

Zhang, Y., et al., "Integrated Rate Control and Buffer Management for Scalable Video Streaming," *IEEE*, 248-251 (2007).

Zhang, Y., et al., "Joint Rate Allocation and Buffer Management for Robust Transmission of VBR Video," *Acta Automatica Sinica*, 34(3):337-343(2008).

\* cited by examiner

CANONICAL SCHEDULING FOR HETEROGENEOUS CONTENT DELIVERY

FIELD OF THE INVENTION

The present invention relates generally to computer-based methods and apparatuses, including computer program products, for canonical scheduling for heterogeneous content delivery.

BACKGROUND

Digital compressed video based on the Moving Picture Experts Group (MPEG) set of standards has become the predominant choice for delivering and storing broadcast-quality digital video content. The MPEG systems layer multiplexes several compressed elementary streams (video, audio and data) into a single transport stream (TS). The transport stream consists of a sequence of transport packets, suitable for storage and network transmission of the encoded program. Several, possibly interleaved, TS packets put together comprise a single compressed frame of an underlying elementary stream. The header of a TS packet contains an identifier to indicate the specific elementary stream that contributes to the payload of the packet. In typical transmission networks, multiple TS packets are further aggregated into a single network packet. In streaming content delivery applications (e.g., live TV, video on demand (VoD)), an integral number of TS packets are encapsulated into a User Datagram Protocol (UDP) or Real-time Transport Protocol (RTP) packet, and the departure time of each packet is tightly controlled in order to ensure that the receiver buffer never overflows on one hand and the receiver never starves for frames on the other. The header of an RTP packet contains a timestamp that denotes the relative departure time of the packet at the sender. In download-based content delivery applications (e.g., many examples of Internet-based video delivery), the sequence of TS packets is treated as a file, and pieces of the file are encapsulated into a Transmission Control Protocol (TCP) packet. The departure time of each packet is primarily controlled by the TCP feedback mechanism from the receiver. In addition, a bandwidth limit may be placed by the sender in order to conserve network resources and enforce fairness amongst the different outgoing streams. Functions such as precise departure timing and bandwidth limiting are performed by the scheduling logic of the content delivery server.

Depending upon the application, content scheduling may be based on the embedded timestamps in the transport or network packets, on the inherent bit-rate of content, or on a configured bandwidth limit. For example, MPEG encoders embed a time-base referred to as a Program Clock Reference (PCR) in the TS packet header. A PCR value is included in a subset of TS packets, and denotes the relative departure time of each packet at the encoder. A streaming scheduler may use the embedded PCR values to determine the exact departure time of each packet from the content delivery server. In open-loop networks with no global clock, the PCR may also be used by the decoder to lock its clock to that of either the server or the original encoder of the content. If the content is encoded as a constant bit-rate (CBR) transport stream, a streaming scheduler may instead use the encoded bit-rate to periodically dispatch packets, using a scheme such as Shaped Virtual Clock. Similarly, a download-based scheduler may use the configured bandwidth limit to place an upper bound on delivery timing. In either case, the scheduler may be implemented as a Just-in-Time (JIT) scheduler, wherein packets depart exactly at the instants dictated by the delivery timing logic, or as an Earliest Deadline First (EDF) scheduler, in which the delivery timing is merely used to establish a sorted departure order for the outgoing packets. It is noted that different content delivery applications place different requirements on the delivery timing of the served streams.

FIG. 1 illustrates a typical video-on-demand server 100 found in the prior art. Video content is ingested into the server 100 as files 104, and stored in a media storage device 106. The source 102 of content may be a folder fed by a satellite receiver, or may be another content server. Files 104 may be ingested offline under the command of network management software (not shown) or in real time based upon a receiver request for content. The server 100 consists of multiple line cards 110a-b connected to its network interfaces, each of which is controlled by a scheduler 114a-b (the shaded triangles in FIG. 1) responsible for dispatching network packets to the receivers 118 via a communications network 116. For each served stream, the scheduler 114a-b fetches the content payload from the media storage device 106, assembles it into UDP or RTP network packets, determines the delivery time of each packet, and places each packet on the interface to the network 116 at the determined time. In this configuration, there is typically no feedback from the receivers 118. For CBR video streams, the departure time for each packet may be computed using the packet size and the encoded bit-rate of the content file. Alternatively, for CBR or variable bit-rate (VBR) video streams, the departure time may be computed using the embedded PCR values in the TS packets. A high-fidelity system clock 112 is used by each scheduler as the source of time.

FIG. 2 illustrates a typical live video server 200 found in the prior art. The purpose of this configuration is to process live channels and serve the incoming content with minimal delay. Such processing (not shown in the figure) may include replicating each incoming channel into multiple copies, e.g., to convert broadcast feeds into personalized or "group-cast" streams, converting a multi-program TS into several single-program TS, e.g., as required by cable Switched Digital Video (SDV) applications, converting CBR streams to and from VBR streams based on receiver requirements, splicing advertisements into the incoming channels, de-jittering the channels, or any combination thereof. In such applications, video content is ingested from one or more content sources 202 into the server 200 as real-time channels 204 and stored into a transient buffer memory 206. The processing described above may be performed prior to storage or upon retrieval from storage during delivery. For each served stream, a scheduler 214a-b (shown as the shaded triangles in FIG. 2) fetches the content from the transient memory 206, assembles it into UDP or RTP packets, determines the delivery time of each packet (based on PCR or CBR bit-rate), and places each packet on the interface to the network 216 at the determined time. Since channels 204 are ingested in real time from multiple content sources 202, assuming there is no global clock that synchronizes the system clocks of each source with that of the server, additional provisions are included to ensure that the buffer memory 206 does not overflow or underflow due a rate mismatch in clocks. Typically, this is done by implementing a phase lock loop (PLL) 220a-b for each incoming channel 204, using the embedded timing information in the video content. Each such PLL is used to adjust the clock 222a-b that drives the scheduler 214a-b for each served stream derived from that channel 204.

In principle, Internet content delivery scheduling is similar to video-on-demand scheduling. For example, in Adobe Real Time Messaging Protocol (RTMP) streaming, embedded timing information is used to control delivery timing of each packet. In another example, in HTTP progressive download applications, a nominal bit-rate configured by the server software is used by the scheduler to place an upper bound on delivery timing. In most Internet content delivery, the network operates in a closed-loop fashion, wherein TCP feedback from the receiver may block the delivery of packets. To accommodate such feedback, the scheduler in such servers uses the state of the TCP window to determine whether a stream is currently eligible for dispatch, and performs the delivery timing function only on currently non-blocked streams.

In some video delivery applications, there is an additional requirement to speed up (or burst) packets, with respect to their determined delivery time, at some intervals specified by the server software. For example, primarily in IP-based live television, such bursts may be used whenever a receiver changes channels so as to facilitate an "instant" channel change feature (as opposed to waiting for the next anchor frame to arrive and for the decoder buffer to fill), or may be used at splice points for ad insertion, in order to compensate for the difference in decoder buffer fullness at splice points and achieve a seamless splice. The same kind of bursting technique may also be used in HTTP progressive download applications, at the beginning of the stream, to ensure that the decoder buffer stays ahead of the required display time of each frame, thereby preventing buffer underflow. To provide for such a feature, a scheduler typically weights the determined delivery time of each packet in the specified burst interval, with a specified burst factor. This weighted delivery time is then used by the scheduler to govern packet dispatch.

Such diverse applications are typically handled by different server equipment, each implementing a scheduler suitable for the respective application. Stored content delivery is handled by dedicated VoD servers in cable networks, most of which only support bandwidth-based CBR delivery, and is handled by web servers or proprietary streaming servers (e.g., for RTMP) in the Internet. Live content processing and delivery is handled by specialized equipment such as groomers and splicers. There is an emerging trend in the industry towards converged video delivery to multiple screens. In such a world, users receive live and on-demand content all via personalized streams. Furthermore, users expect to receive such content on multiple devices, each with different capabilities (e.g., TV set-top boxes that require streaming service and PCs that prefer progressive download) and connected to different networks (e.g., HTTP/TCP-based Internet and UDP/RTP-based managed networks). It would be cost prohibitive to deploy specialized server resources separately for each delivery application, all dimensioned to handle the peak request load from the users, especially since most users do not expect content delivery of all types simultaneously. There are no adequate provisions in the prior art for building a converged delivery server that simultaneously supports multiple delivery types without expensive replication of server resources (e.g., one server card for on-demand HTTP download and another for live TV streaming).

SUMMARY OF THE INVENTION

The techniques described herein provide methods and apparatuses for canonical scheduling of heterogeneous content streams with differing scheduling needs. Such scheduling is targeted towards converged content delivery servers offering any mix-and-match of multiple applications such as live television and video-on-demand over open-loop managed networks, and Internet-based streaming and progressive download over closed-loop networks. The techniques provide for heterogeneous scheduling without incurring the cost of building replicated scheduling logic, one per application, as is typically found in the prior art. Without loss of generality, the techniques are described in the context of video delivery with the knowledge that it is equally applicable to other types of content delivery. Furthermore, within the context of video, the description relies on concepts related to MPEG-encoded video, specifically to embedded timing and bit-rate information, again with the knowledge that it is equally applicable to other encoded content that uses similar concepts.

In one aspect, there is a computerized method. The method includes preprocessing a content stream of bits. The preprocessing includes dividing the content stream of bits into data packets and assigning a timestamp to each data packet. The method also includes transmitting the preprocessed content stream of bits upon request from a receiver. The transmitting includes establishing a second timestamp based on the assigned timestamp from at least a portion of the respective data packets, scheduling the data packets for transmission based on the second timestamp, and transmitting the data packets based on the schedule.

In another aspect, there is a computer program product. The computer program product is tangibly embodied in a machine-readable storage device. The computer program product includes instructions being operable to cause a data processing apparatus to preprocess a content stream of bits. The preprocessing includes dividing the content stream of bits into data packets and assigning a timestamp to each data packet. The computer program product also includes instructions being operable to cause a data programming apparatus to transmit the preprocessed content stream of bits upon request from a receiver. The transmitting includes establishing a second timestamp based on the assigned timestamp from at least a portion of the respective data packets, scheduling the data packets for transmission based on the second timestamp, and transmitting the data packets based on the schedule.

In another aspect, there is a system. The system comprises means for preprocessing a content stream of bits. The preprocessing includes means for dividing the content stream of bits into data packets and means for assigning a timestamp to each data packet. The system also includes means for transmitting the preprocessed content stream of bits upon request from a receiver. The transmitting includes means for establishing a second timestamp based on the assigned timestamp from at least a portion of the respective data packets, means for scheduling the data packets for transmission based on the second timestamp, and means for transmitting the data packets based on the schedule.

In another aspect, there is a system for canonical scheduling of heterogeneous content streams. The system includes an ingest processor configured to divide a content stream of bits into data packets, and assign a timestamp to each data packet. The system also includes a delivery processor configured to establish a second timestamp based on the assigned timestamp from at least a portion of the respective data packets, schedule the data packets for transmission based on the second timestamp, and transmit the data packets based on the schedule.

In another aspect, there is a computerized method. The method includes receiving a first content stream of bits and a second content stream of bits. The method also includes dividing the content streams of bits into data packets based on the format of the respective content streams, and assigning a timestamp to each data packet, the timestamp being normalized according to a controlled time value. The method also includes storing the data packets in a storage device. In some examples, the method can include retrieving the data packets from the storage device, establishing a second timestamp based on the assigned timestamp from at least a portion of the respective data packets, scheduling the data packets for transmission based on the second timestamp, and transmitting the data packets based on the schedule.

In some examples, any of the aspects can include one or more of the following features. The content stream of bits can be of type RTP, MPEG-2 transport stream, Adobe RTMP, Interleaved RTSP, FTP, or HTTP. The dividing the content stream of bits can include determining a packet size based on the type of the content stream of bits, the network packetization of the content stream of bits, the maximum transmission unit of the transmitted data packets, or any combination thereof, and mapping the content stream of bits to data packets based on the packet size.

In other examples, the assigning a timestamp can include determining a timestamp for each data packet, normalizing the timestamp according to a controlled time value, and inserting the normalized timestamp into the packet header of the data packet. The normalizing can include modifying the timestamp based on a frequency of the controlled time value, the frequency associated with the determined timestamp, or any combination thereof, and adjusting the bit length of the timestamp to match a predetermined bit length.

In some examples, where the content stream includes network timestamp information, the determining a timestamp can include identifying a network timestamp in the content stream and generating a timestamp based on the network timestamp. In other examples, where the content stream includes network timestamp information, the determining a timestamp can include identifying a first network timestamp and a second network timestamp in the content stream, determining a difference between the first network timestamp and the second network timestamp, and generating a timestamp based on the difference.

In some examples, where the content stream includes embedded timestamp information, the determining can include identifying a first embedded timestamp and a second embedded timestamp in the content stream, determining a difference between the first embedded timestamp and the second embedded timestamp, and generating a timestamp based on the difference. In other examples, where the content stream includes a bit-rate, the determining can include determining a packet interval based on the packet size and the bit-rate and generating a timestamp based on the packet interval. In still other examples, where the content stream does not include embedded timing information or a bit-rate, the determining can comprise determining a packet interval based on the packet size and a preselected bit-rate, and generating a timestamp based on the packet interval.

In other examples, the controlled time value can be a system clock. The determining can include generating a timestamp based on the system clock at the arriving time of the content stream of bits. The system clock can be based on a network timing protocol.

In some examples, the establishing a second timestamp can be based on using the assigned timestamp without any modifications. In other examples, the establishing a second timestamp can be based on modifying the assigned timestamp. The modifying can include determining a weight adjustment value for the data packets, and applying the weight adjustment value to the timestamp. The weight adjustment value can be based on a speed up factor, a slow down factor, a delivery rate, or any combination thereof. The weight adjustment value can change over time.

In other examples, the modifying can include determining a skew adjustment value for the data packets, and applying the skew adjustment value to the timestamp. The skew adjustment value can be based on a difference between receipt of the data packets into a memory device and retrieval of the data packets from the memory device.

In some examples, the scheduling can include normalizing the second timestamp to a controlled time value, inserting the normalized second timestamp into a data structure, and sorting the data structure based on the normalized second timestamp. The transmitting can include mapping the data packets into network packets. In other examples, the preprocessing can include assigning two or more timestamps to each data packet.

Any of the examples described herein can include one or more of the following advantages. These techniques provide the means for a single canonical scheduler, based on the concepts of timestamp-based scheduling, skew adjustment and weight adjustment, in order to deliver any mix-and-match of multiple types of content streams including walled-garden on-demand video, live television and Internet video from the same content delivery equipment. Such a scheduler may be deployed as part of a converged content delivery server, and provides a cost-effective solution to integrate applications such as live television, on-demand video and audio, and Internet content delivery, all simultaneously in the same platform. Instead of implementing different pieces of logic, or different equipment, to accommodate multiple applications, the invention reduces all content scheduling to a common weighted timestamp-based scheme by harmonizing all ingested content to a canonical representation. A primary advantage over known technology is the provision for ingest processing of content that enables such converged delivery at high scale.

BRIEF DESCRIPTION OF THE DRAWINGS

The foregoing and other objects, features and advantages of the present invention, as well as the invention itself, will be more fully understood from the following description of various embodiments, when read together with the accompanying drawings.

DETAILED DESCRIPTION

In general overview, the described techniques include methods and apparatuses that are for canonical scheduling for heterogeneous content delivery. The techniques are related to efficient and scalable scheduling of content streams, and specifically to the problem of building a canonical scheduler for multiple content delivery applications. Once content is harmonized during preprocessing, the scheduler logic becomes largely independent of the specific type of content delivery application targeted by each outgoing stream. In most content delivery applications, the outgoing bandwidth capacity far exceeds the ingest capacity by several orders of magnitude. The techniques achieve their cost-effectiveness by keeping the (outgoing) scheduling logic itself extremely simple and agnostic of the specific content delivery application, while performing most of the application-specific functions during content ingest and capturing those results in a canonical representation.

Figure 1:
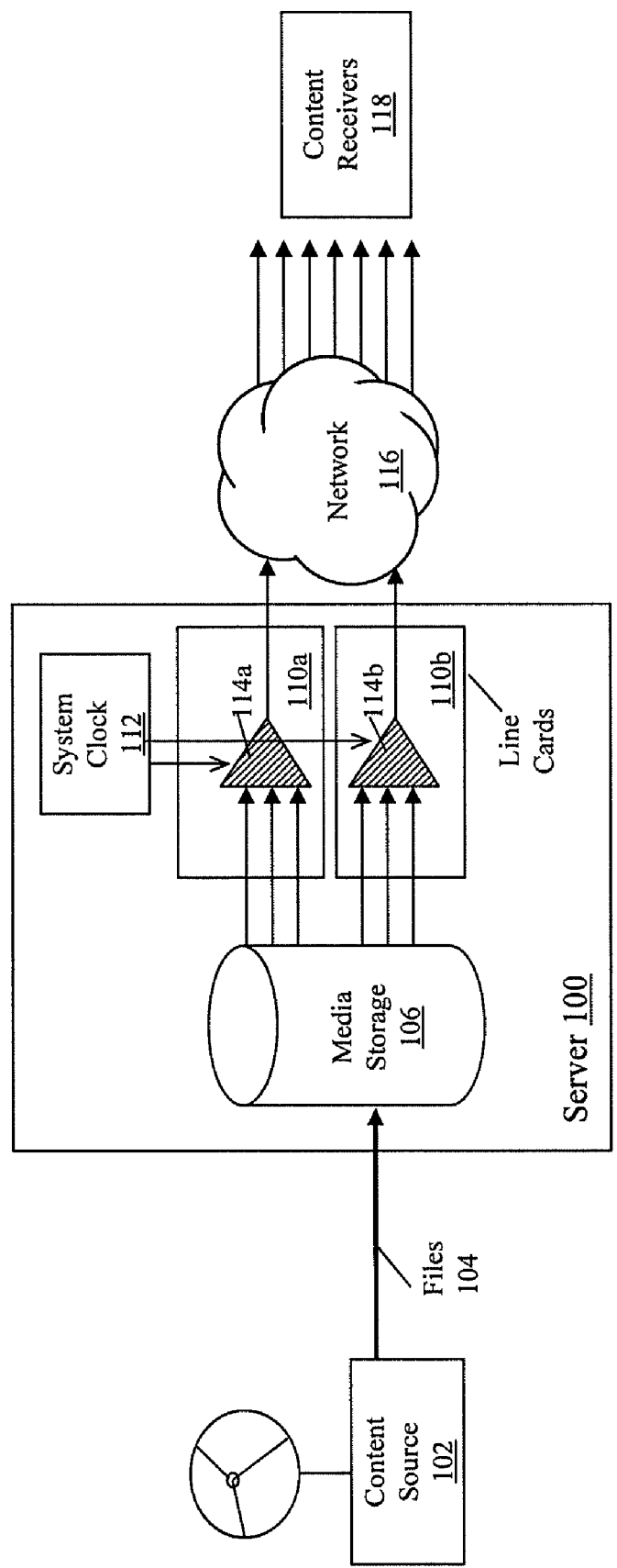
FIG. 1 is a depiction of an apparatus for storing and scheduling content files, as illustrated in the prior art.
Figure 2:
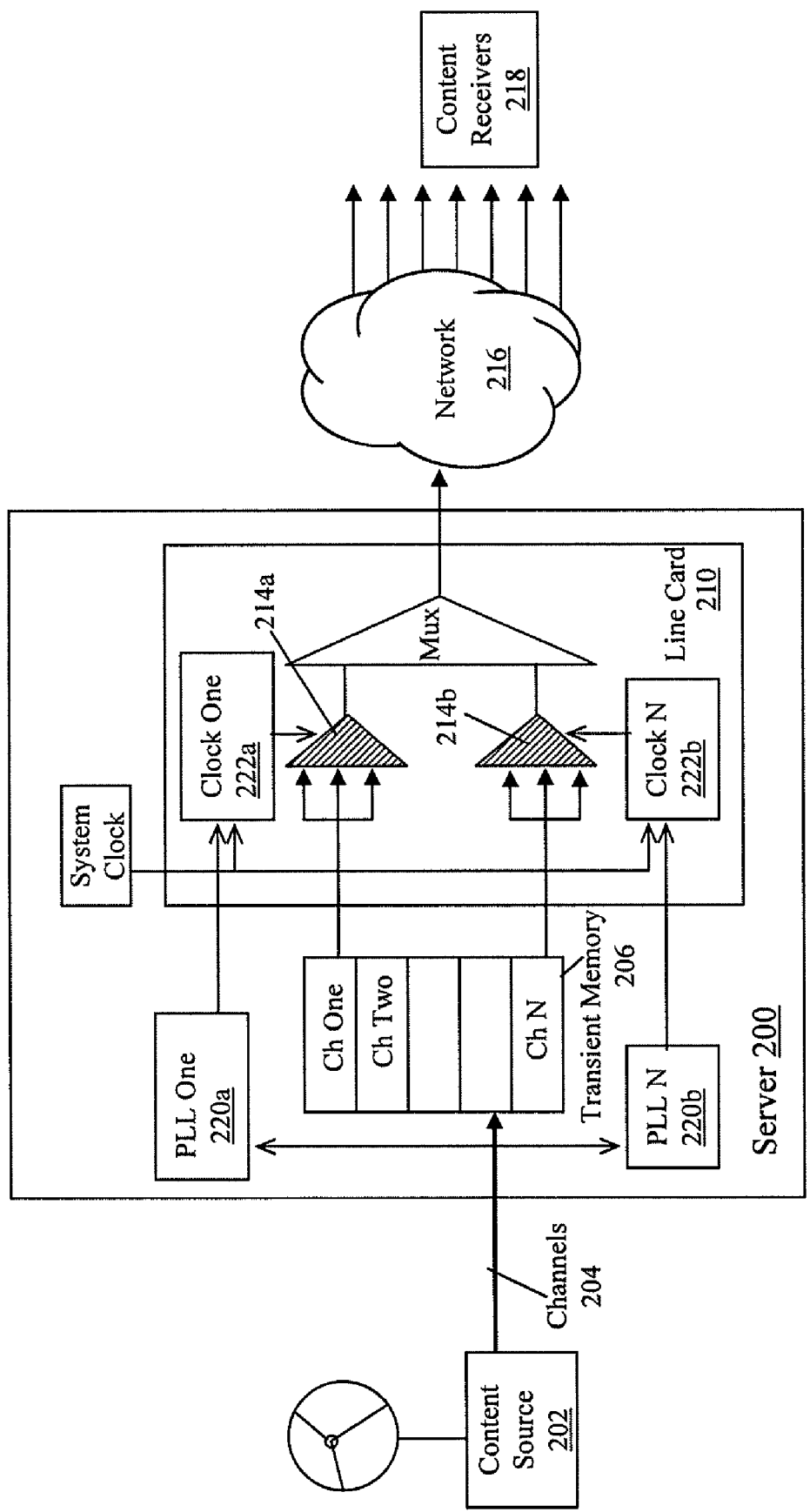
FIG. 2 is a depiction of an apparatus for processing and scheduling live channels, as illustrated in the prior art.
Figure 3:
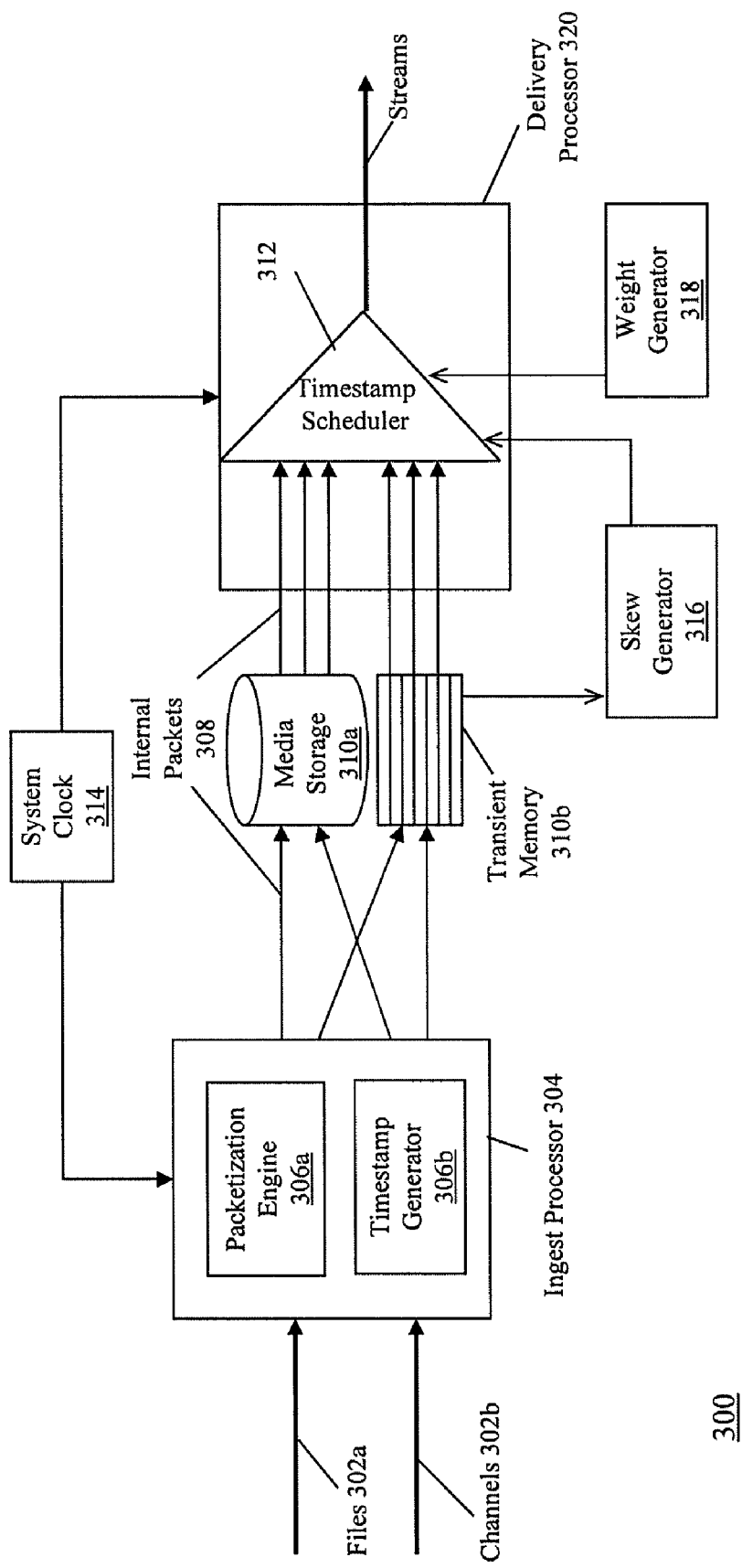
FIG. 3 is a depiction of a system for canonical scheduling of heterogeneous content streams.

FIG. 3 illustrates an exemplary system 300 for canonical scheduling. The ingest processor 304 receives content streams, e.g., as files 302a or as live channels 302b. Prior to storage, the ingest processor 304 preprocesses the content by dividing it into internal packets 308 via the packetization engine 306a and assigns a timestamp for each such packet via the timestamp generator 306b. The internal packets 308 can be a type of data packets. The internal packets 308 are then placed into a storage device, e.g., media storage 310a and/or transient buffer memory 310b. Generally, ingested files are stored into a media storage device (e.g., 310a) for applications such as on-demand video delivery. In other examples, ingested files may be stored in a transient memory (e.g., 310b) if the server functions as a proxy for content delivered from another server. Generally, ingested channels are stored into a transient memory (e.g., 310b) for live applications. In some examples, ingested channels may be stored in a media storage device (e.g., 310a) for applications such as time-shifted television. Upon receiver request for content, the timestamp scheduler 312 residing in a delivery processor 320 of the system 300 retrieves internal packets 308 from storage 310a-b and establishes a second timestamp based on the timestamp assigned to the internal packets 308. The timestamp scheduler 312 can establish the second timestamp in various ways. The second timestamp can be established, for example, by using an assigned timestamp which has not been modified. In another example, the timestamp scheduler 312 can establish the second timestamp by modifying the assigned timestamp.

The assigned timestamp can be modified in different ways. For example, the assigned timestamp can be modified directly in the internal packets 308 to establish a second timestamp. In another example, the assigned timestamp can be extracted from the respective internal packets 308 and inserted into a data structure before being modified to establish a second timestamp. The modifications can also have different results. For example, the modifications to the timestamp can result in a second timestamp that is not different in value than the timestamp assigned to the internal packets, or the modifications can result in a second timestamp that is different in value than the assigned timestamp.

In some examples, the timestamp can be modified for at least a portion of the internal packets 308, normalized to the system clock 314. A skew generator 316 and a weight generator 318 act as inputs into the timestamp scheduler 312 to provide values for timestamp modification. Subsequently, the system 300 transmits the internal packets 308 belonging to non-blocked streams using, for example, a schedule based on the second timestamps. In some examples, the schedule could be executed in a JIT or EDF fashion. During transmittal, each internal packet 308 is converted into a network packet.

When content is ingested by the system 300, it is preprocessed into internal packets 308 ready for delivery. One aspect of the preprocessing by the system 300 is assigning a timestamp to the internal packets 308. Depending upon the target application(s), the timestamp is determined based on, for example, embedded timing information, nominal bit-rate or some default bit-rate. The timestamp is then normalized according to a controlled time value (e.g., the system clock 314), and inserted into the header of the respective internal packet 308. The delivery scheduler 312, on receiver request for content, retrieves the internal packets 308 from storage (e.g., media storage 310a or transient memory 310b) and maps them into network packets. The delivery timing logic is based on computing a normalized timestamp, based on, for example, three parameters—the timestamp stored in the internal packet 308, a skew adjustment provided by the skew generator 316 to maintain clock synchronization, and a burst factor provided by the weight generator 318 to speed up transmission. In some examples, the same logic is used to determine the delivery timing of each outgoing network packet irrespective of the application.

The functions of timestamp generation and packetization conducted by the ingest processor 304 during content stream ingest are integral to the working of the system 300. In some embodiments, it may be considered as part of the scheduling logic itself. The examples described herein provide for different variations of packetization that may be used by the packetization engine 306a. If content is being ingested as a continuous stream (e.g., a live channel), the ingest processor 304 may map each received UDP or RTP packet into a single internal packet 308. Alternatively, the ingest processor 304 may map a number of transport packets of an ingested file 302a into an internal packet 308. For example, in most broadcast networks, it is recommended to include no more than 7 TS packets in a network packet. If neither is a viable option, e.g., for content to be delivered exclusively via a TCP-based download application, the ingest processor 304 may determine a packet size by, for example, taking into account the Maximum Transmission Unit (MTU) size of the network.

To enable multiple content delivery applications, the techniques provide for several variations of timestamp generation. For example, if the same content is to be delivered via multiple applications, the ingest processor 304 may assign multiple timestamps to a single packet. For content streams that contain embedded timing information (e.g., CBR or VBR MPEG transport streams, Adobe Flash Video files), the ingest processor 304 may use such information to generate the internal timestamp. For example, in the case of MPEG transport streams, the timestamp may be determined from the 27 MHz PCR value of the first TS packet in the mapped internal packet. If PCR values are not present in every TS packet, as is usually the case, a value is interpolated using the two most adjacent PCR values (one before and one after the packet). As another example, in the case of Adobe Flash Video files, the internal timestamp may be determined from the timestamp field (in milliseconds) found in the FLV tag associated with each video and audio packet in the file. For content ingested as an RTP stream (e.g., a live channel), the RTP timestamp (based on, for example, a 90 kHz clock) in the network packet may be used in lieu of the embedded timing information. Since the internal timestamp is used primarily to control delivery timing, the required fidelity is largely a function of the tolerable scheduling jitter. For example, if the embedded timing is in milliseconds, the internal timestamp controls delivery of each packet to the nearest millisecond, representing a maximum jitter of exactly 1 millisecond.

As an alternative to time-based information, the ingest processor 304 may use a bit-rate along with the chosen packet sizes to compute the internal timestamp. For example, the timestamp may be based on the CBR rate of an MPEG transport stream or a content-specific rate provided by software, as is common in Internet-based content delivery. In the absence of any bit-rate information during preprocessing, the ingest processor 304 may choose any nominal rate (e.g., a preselected bit-rate) to generate the timestamp. Subsequently, if a bit-rate is provided during delivery, the delivery processor 320 can receive an appropriate weight adjustment from the weight generator 318 to convert the nominal rate into the desired bit-rate. In fact, this method may also be used to achieve pure best-effort (i.e., round-robin) or weighted best-effort delivery by choosing the same nominal rate for each ingested content stream and using an EDF discipline.

In general, the scheduling method is based on the premise that once packet boundaries are known in advance, all content scheduling may be reduced to a weighted timestamp-based algorithm. Accordingly, when content is divided into internal packets 308 during ingest, each packet j of content i is given a timestamp $T(i,j)$. The timestamp $T(i,j)$ can be assigned by the timestamp generator 306b. The timestamps of successive packets essentially encode a nominal inter-packet delivery rate. In some examples, during transmission of content i to a receiver, the timestamp of each packet is modified to $T(i,j)*W(k)+S(k)$, where k denotes the delivered stream, $W(k)$ is a weight adjustment and $S(k)$ is a skew adjustment. The weight adjustment retrieved from the weight generator 318 is applied by the timestamp scheduler 312 in order to achieve an actual inter-packet delivery rate as opposed to the nominally encoded one, e.g., to accommodate for speed up, or to provide a bit-rate that was not known during preprocessing of the content stream. This adjustment is not expected to change on a packet by packet basis (as in that case, the encoded timestamp would be rendered meaningless), but may be changed by software on an infrequent basis (e.g., some periodic basis greater than every packet delivery period). In one example, the weight may be set to 1 and the actual inter-packet delivery rates equal the encoded nominal rates. The skew adjustment provided by the skew generator 316 is applied by the timestamp scheduler 312, for example, in order to achieve a different clock rate as opposed to the system clock of the server, e.g., to accommodate for a clock rate mismatch with respect to an encoder of a live channel being ingested. In one example, e.g., for any kind of stored content delivery, the skew may be set to 0. While the description here uses an additive skew calculation, alternative implementations may use a multiplicative skew calculation or other skew calculations to modify the timestamp.

Once the timestamp scheduler 312 determines a modified timestamp during stream delivery, the timestamp is further normalized with the system clock 314 by adding the difference between the modified timestamp of the first delivered packet and the system clock 314 value at stream initiation. The scheduler 312 then inserts the normalized modified timestamp into a data structure. The scheduler 312 sorts the data structure based on, for example, the normalized modified timestamp. The delivery processor 320 then dequeues and transmits the packets according to a scheduling scheme, for example in a JIT or EDF fashion. In JIT scheduling, packets are dequeued by the delivery processor 320 when the normalized modified timestamp equals the system clock 314, while in EDF scheduling, the delivery processor 320 operates in a work conserving manner and dequeues packets in sorted order of normalized modified timestamps. The delivery processor 320 may also use a combination of JIT for some streams (e.g., for streamed delivery to legacy set top boxes) and EDF for others (e.g., for statistically multiplexed delivery and best-effort delivery). It is noted that the dequeue and delivery logic is not restricted by the techniques described herein. To accommodate for closed-loop networks in the mix, streams blocked by TCP feedback are removed from dequeue consideration. The timestamp normalization mentioned above can account for such blocked intervals by discounting (e.g., by adding to the normalized timestamp the total amount of time a stream was blocked in the past) such intervals.

Figure 4A:
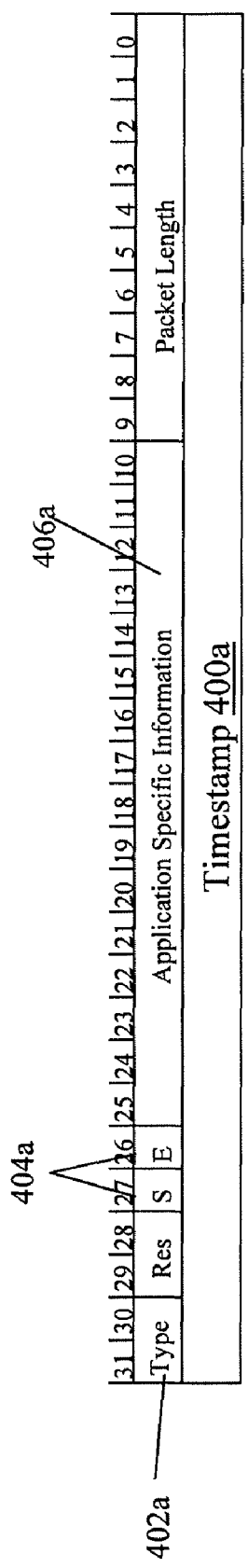
FIG. 4A is an example of a fixed-size header of a data packet.
Figure 4B:
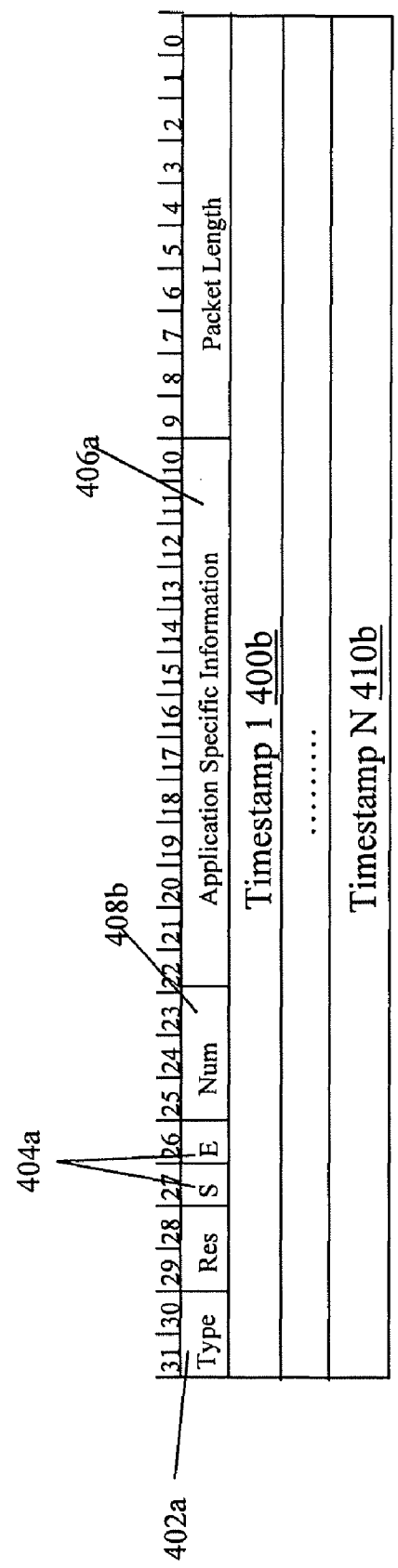
FIG. 4B is an example of a variable-sized header of a data packet.

FIGS. 4A and 4B show examples of variations of the internal packet header format, with a focus on timestamp representation. The payload of the packet (not shown) is simply the portion of the content assembled by the ingest processor 304 into an internal packet 308. In a first variant, shown in FIG. 4A, the format consists of a fixed-size header of 8 bytes and is structured to store a single timestamp. The "Type" field 402a in the header describes the contents of the packet. The "S" and "E" flags 404a are used to delineate the internal packet boundaries across multiple storage units, based on the underlying storage representation. The "application specific information" field 406a is populated based upon the type of the packet. In an exemplary embodiment, the system 300 uses a 90 kHz system clock 314, and the 32-bit "Timestamp" field 400a denotes ticks of the 90 kHz clock. If any embedded timing information is based on a different clock rate, or a different range of timestamps, the ingest processor 304 can normalize the values to the 32-bit 90 kHz field by modifying the timestamp and adjusting the bit length. For example, the 42-bit MPEG PCR is composed of a 33-bit 90 kHz value and a 9-bit 27 MHz value for further precision. In this case, the ingest processor 304 uses the 32 least significant bits of the 90 kHz value and ignores the higher precision field. As another example, FLV files provide a 24-bit timestamp in milliseconds. Here, the ingest processor 304 multiplies the value by 90 and pads the most significant bits with 0 to generate a 32-bit internal timestamp.

A second variant of the internal packet header, shown in FIG. 4B, allows for inserting multiple timestamp values (represented here as Timestamp 1 400b through Timestamp N 410b). The size of the header is variable, depending on the number of timestamps included. The "Num" field 408b denotes the number of timestamps assigned to the same packet. In examples using this exemplary packet header, the server can select the most appropriate timestamp field, during delivery, depending upon the desired type of scheduling. For example, a content file can be streamed to a television set top box using a first timestamp based on embedded timing information and also streamed to a personal computer using a second timestamp based on a nominal bit rate. This header also includes the "Type" field 402a, "S" and "E" flags 404a, and the "application specific information" field 406a, as noted in the previous paragraph.

Figure 5:
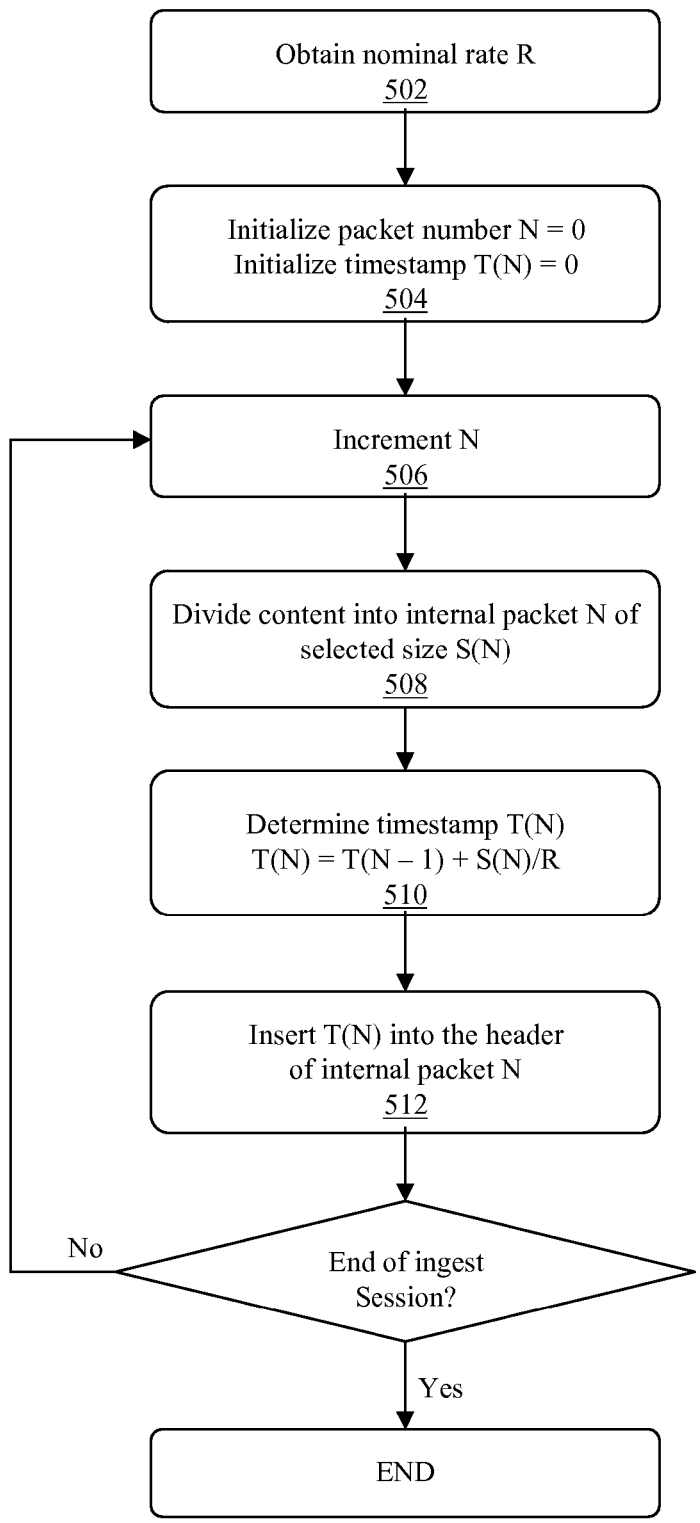
FIG. 5 is a flowchart of an exemplary method for preprocessing of a content stream using nominal rates.

FIG. 5 illustrates an exemplary method 500 for preprocessing of a content stream using nominal bit rates. The ingest processor 304 obtains (502) a nominal rate (represented as R). As explained above, the bit-rate can be obtained in various ways, for example by being communicated to the ingest processor 304 by software, e.g., based on the encoded bit-rate of the content, or chosen by the ingest processor 304. The packet number (represented as N) and the timestamp (represented as T(N)) are initialized (504) by the ingest processor 304. The ingest processor 304 increments (506) the packet number. For the duration of the ingest session, the packetization engine 306a divides (508) the incoming content streams (e.g., files 302a and/or channels 302b) into internal packets 308 of a determined size (represented by S(N)), using one of the variations outlined above. For each packet, an inter-packet interval can be computed, for example, as the size of the internal packet 308 divided by the desired bit-rate (i.e., S(N)/R). The timestamp assigned to the internal packet 308 by the timestamp generator 306b is determined (510) to be the inter-packet interval added to the timestamp of the previous packet. The ingest processor 304 inserts (512) the timestamp into the header of the internal packet 308.

Figure 6:
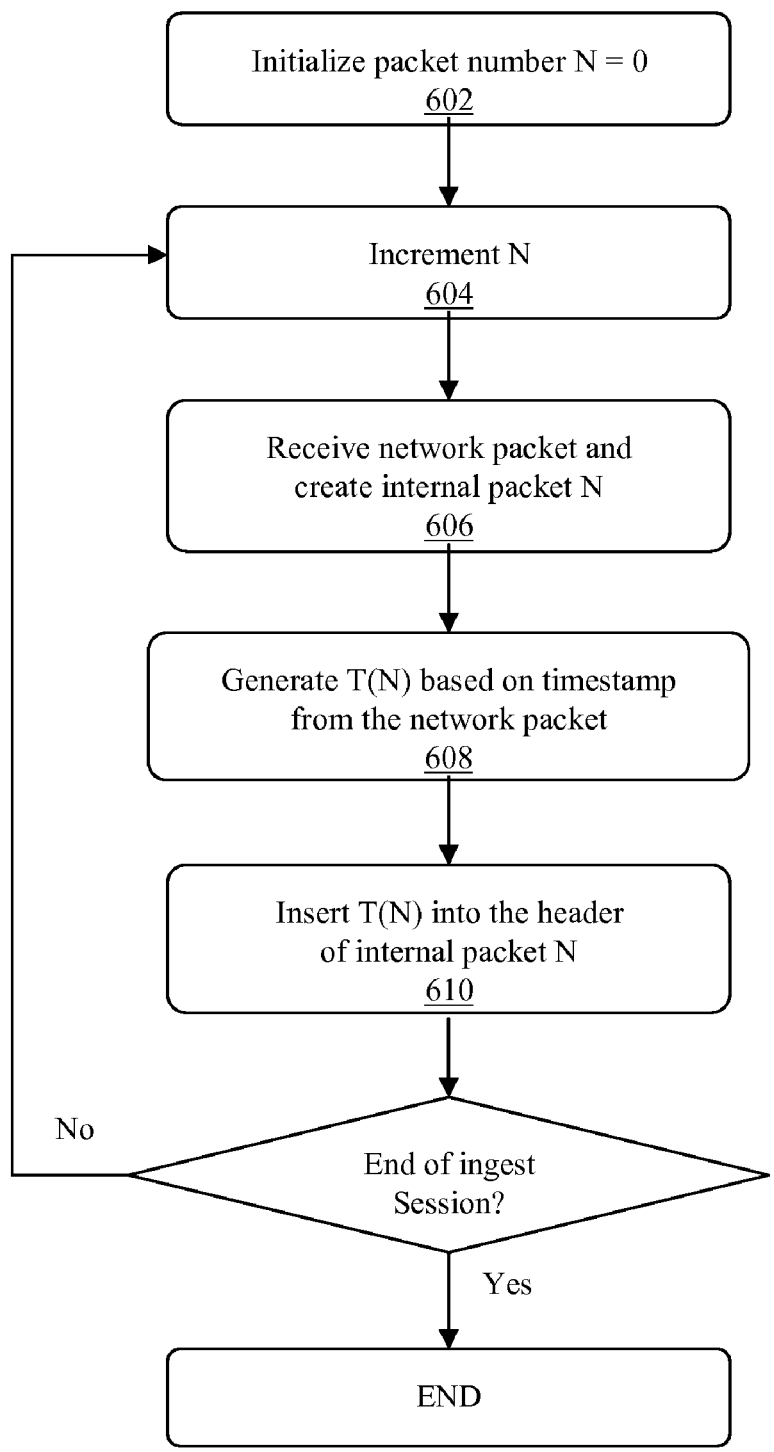
FIG. 6 is a flowchart of an exemplary method for preprocessing of a content stream using network packet timestamps.

FIG. 6 illustrates an exemplary method 600 for preprocessing of a content stream using the timestamp in the network packet, e.g., for content ingested as an RTP stream. The packet number (represented as N) is initialized (602) by the ingest processor 304. The ingest processor 304 increments (604) the packet number. A network packet is received by the ingest processor 304. The packetization engine 306a creates (606) an associated internal packet 308 with a packet number N. Since each network packet is mapped one-to-one with an internal packet 308 during the packetization stage, the timestamp generator 306b identifies a network timestamp in each network packet and generates (608) a timestamp based on that network timestamp. After normalizing the generated timestamp to the system clock 314 and correcting for any discontinuities, the timestamp generator 306b inserts (610) the generated timestamp into the internal packet header.

Figure 7:
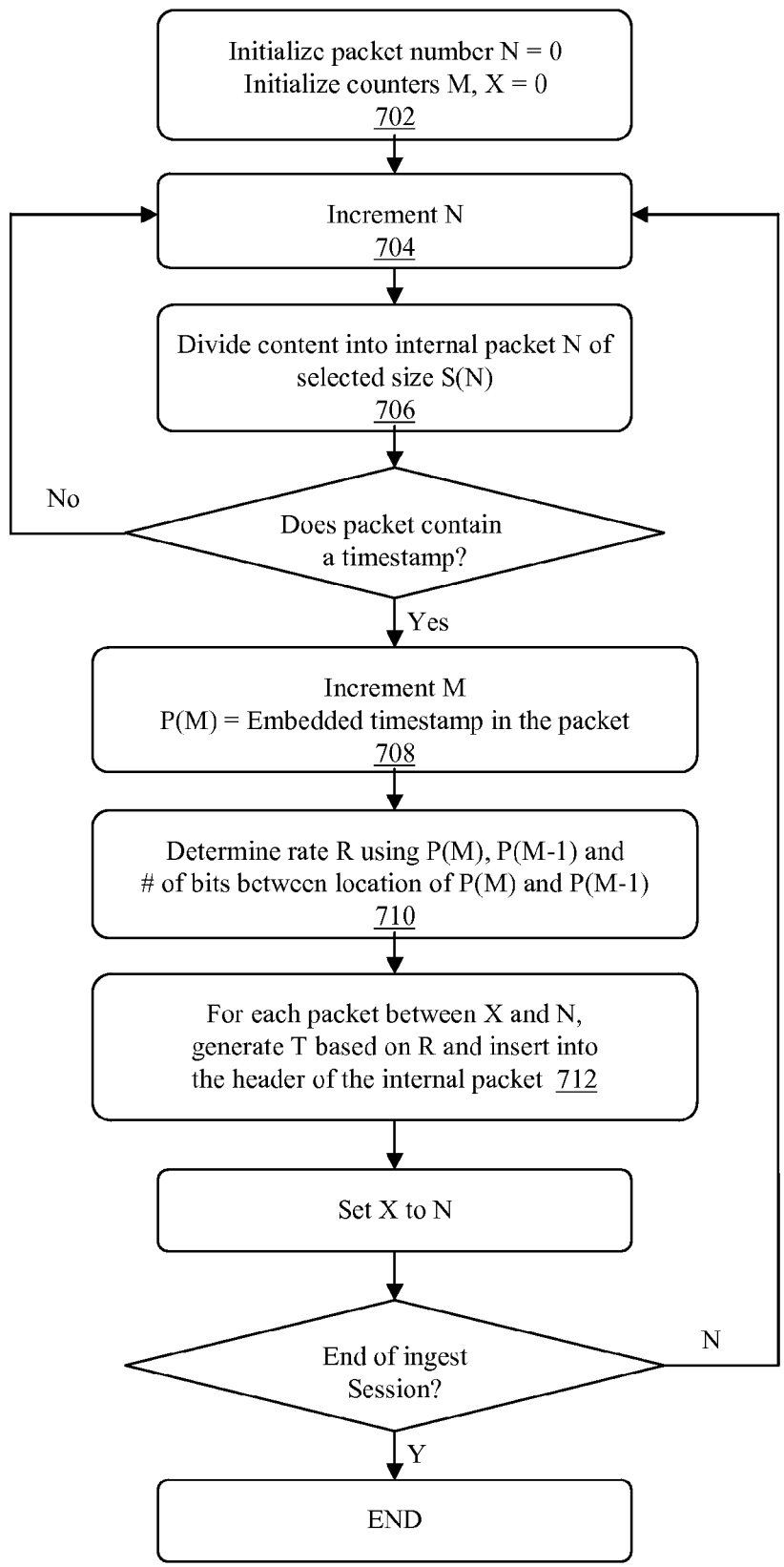
FIG. 7 is a flowchart of an exemplary method for preprocessing of a content stream using intermittent content-based timestamps.

FIG. 7 illustrates an exemplary method 700 for preprocessing of a content stream using embedded timing information in the content, with interpolation to account for the intermittent presence of such information. In some examples, specifically MPEG transport streams, internal packets 308 are assembled using 7 consecutive TS packets, with PCR values in the headers of some of those packets. In other examples, specifically Adobe Flash Video files, internal packets 308 are assembled so that the packet size does not violate the MTU size of the target network, and an integral number of internal packets 308 contain a single Flash media packet. In this case, timestamp values may be found only in those internal packets 308 that contain the beginning of a media packet. The packet number (represented as N) and several counters (represented as M and X) are initialized (702) by the ingest processor 304. The ingest processor 304 increments (704) the packet number. The packetization engine 306a divides (706) incoming content streams (e.g., files 302a and/or channels 302b) into internal packets 308, using one of the variations outlined above. The ingest processor 304 then locates two sequential internal packets 308 which contain embedded timestamps. A difference between the embedded timestamps, for example a rate, is determined (710), by counting the number of bits between the location of the two timestamps, and the time difference in the timestamp values. For each internal packet 308 between those that contain the embedded timestamps, the timestamp generator 306b generates (712) an internal timestamp by using the computed rate and then the generator 306b assigns the timestamp to the internal packet 308. Specifically, the internal timestamp is set to the first embedded timestamp value, added to the number of bits from the location of that value divided by the computed rate, and then normalized for the system clock and corrected for any discontinuities. If, for example, a timestamp is present at the beginning of each internal packet 308, this method defaults to a case in which the internal timestamps exactly match the normalized embedded timestamps. Note that this technique requires some amount of buffering in the ingest processor 304 so as to accommodate at least two packets (and the packets in between) with embedded timing information.

Figure 8:
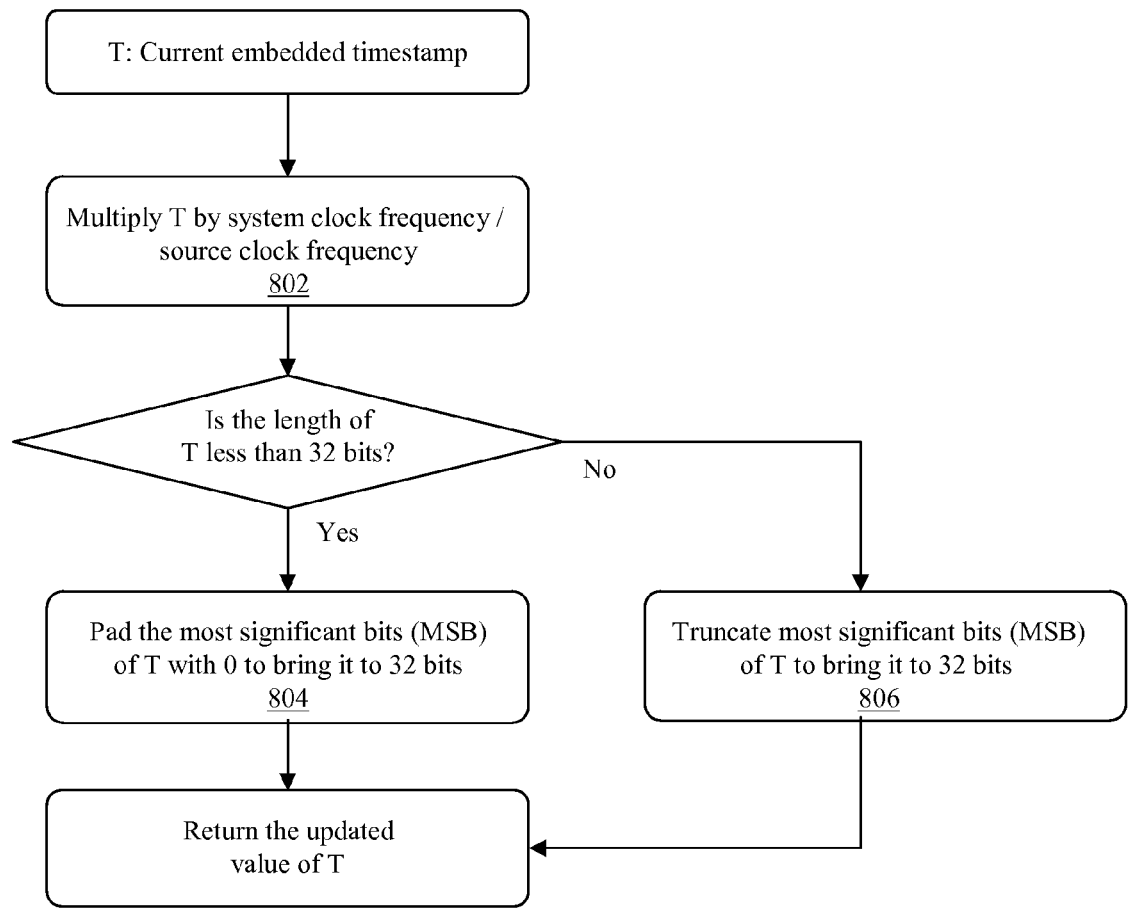
FIG. 8 is a flowchart of an exemplary method for ingest timestamp normalization of a content stream to correct clock frequency and precision.

A common component of network timestamp-based content stream preprocessing (as illustrated in FIG. 6) and embedded timestamp-based content stream preprocessing (as illustrated in FIG. 7) is ingest timestamp normalization, so as to account for a mismatch in clock frequency (e.g., between the 90 kHz system clock and the source clock at the content encoder) and timestamp precision (e.g., between the 32-bit internal timestamp field and the number of bits in the embedded timestamp), and to correct for discontinuities. FIG. 8 illustrates an exemplary method 800 for a step of the normalization procedure, as conducted by the system 300. The timestamp generator 306b multiplies (802) the embedded timestamp (represented as T) by a factor that reflects the different frequencies between, for example, the source clock and the system clock. If the length of the embedded timestamp is less than 32 bits, the timestamp generator 306b pads (804) the most significant bits of the embedded timestamp with zeroes to bring it to a length of 32 bits. If the length of the embedded timestamp is greater than 32 bits, the timestamp generator 306b truncates (806) the most significant bits of the embedded timestamp to bring it to a length of 32 bits.

Figure 9:
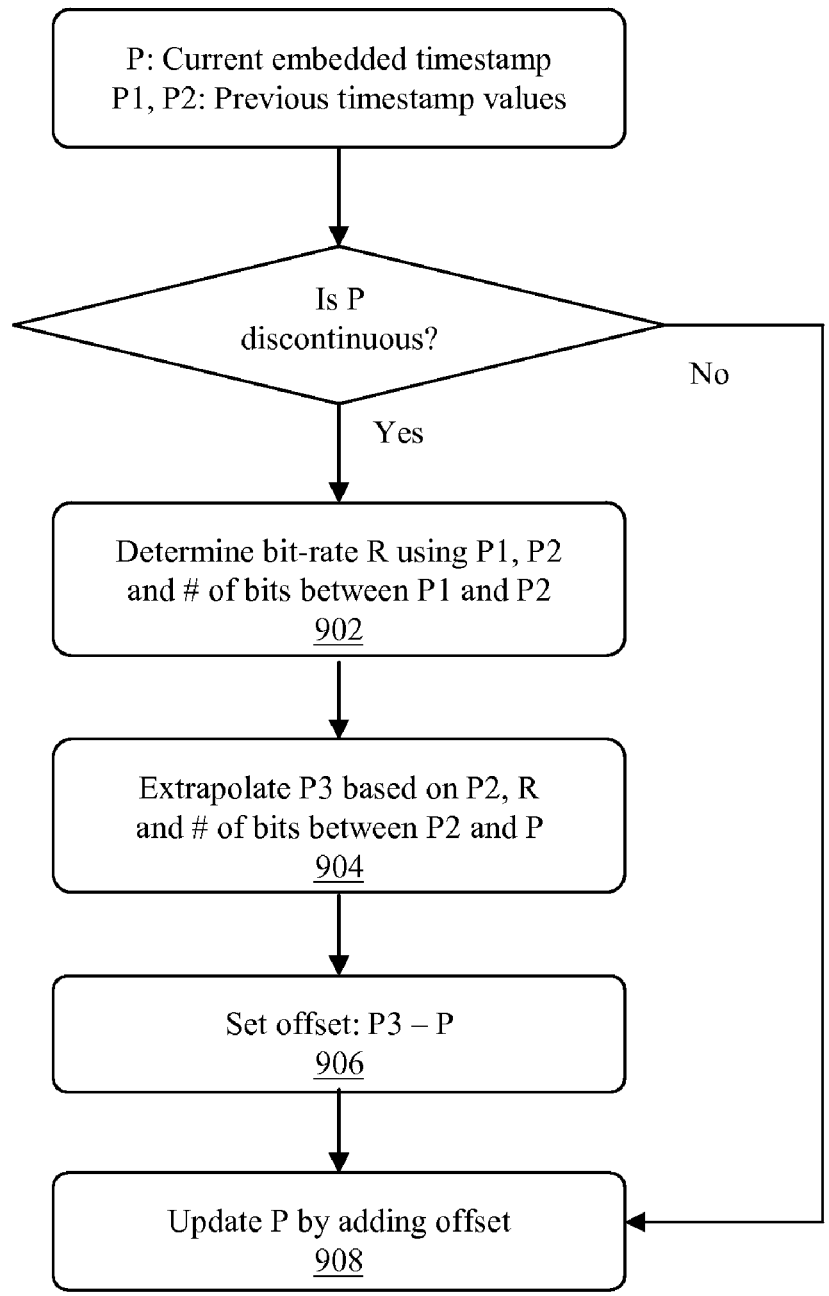
FIG. 9 is a flowchart of an exemplary method for ingest timestamp normalization of a content stream to correct discontinuities based on rate.

FIG. 9 shows an exemplary method 900 of one alternative for another step of normalization, i.e., discontinuity correction, based on rate extrapolation, as conducted by the system 300. In this alternative, whenever a discontinuity is detected (usually indicated by a field in the transport/media or network packet header), the timestamp generator 306b first identifies a first embedded timestamp (represented as P1) and a second embedded timestamp (represented as P2), and determines (902) a bit-rate from the difference between the two embedded timestamps and the number of bits between them. This bit-rate is then used by the timestamp generator 306b to extrapolate (904) a "continuous" timestamp value (represented as P3) based on the value prior to the discontinuity. The timestamp generator 306b sets (906) an offset value as the difference between the actual embedded timestamp and the extrapolated one. The timestamp generator 306b then adds (908) the offset to every subsequent embedded timestamp.

Figure 10:
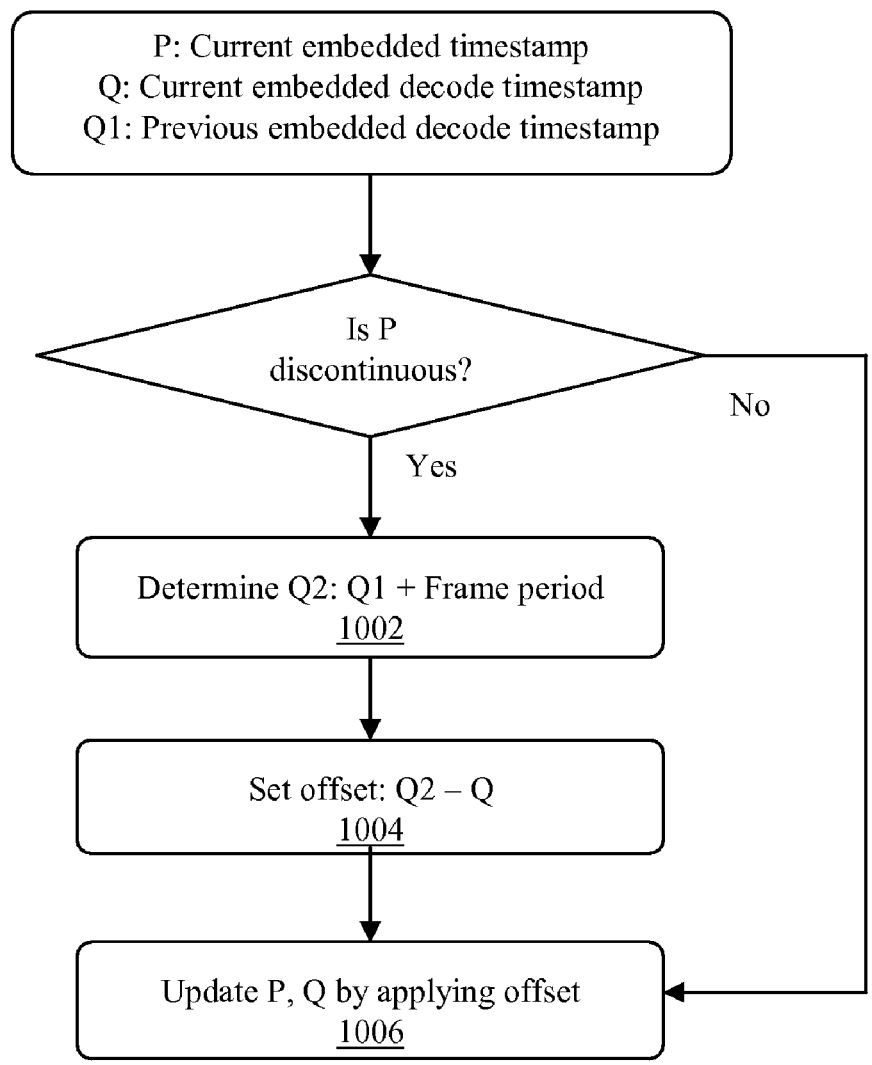
FIG. 10 is a flowchart of an exemplary method for ingest timestamp normalization of a content stream to correct discontinuities based on frame period.

FIG. 10 shows an exemplary method 1000 of another alternative used by the system 300 for discontinuity correction in cases where the content frame rate is known. For example, in MPEG video transport streams, this step may be used for correcting discontinuities in the embedded PCR by using the accompanying embedded decode timestamp (DTS) and the video frame period of the transport stream (e.g., 33 ms in North America broadcast video), when PCR discontinuities occur at frame boundaries. Here, the timestamp generator 306b determines (1002) an extrapolated decode timestamp (represented as Q2) by adding the frame period to the previous (i.e., prior to the discontinuity) decode timestamp (represented as Q1). The timestamp generator 306b calculates (1004) an offset as the difference between the extrapolated value and the embedded decode timestamp after the discontinuity (represented as Q). The timestamp generator 306b then applies (1006) this offset to correct every subsequent PCR by, for example, adding the offset to the current embedded timestamp and the current embedded decode timestamp.

Figure 11:
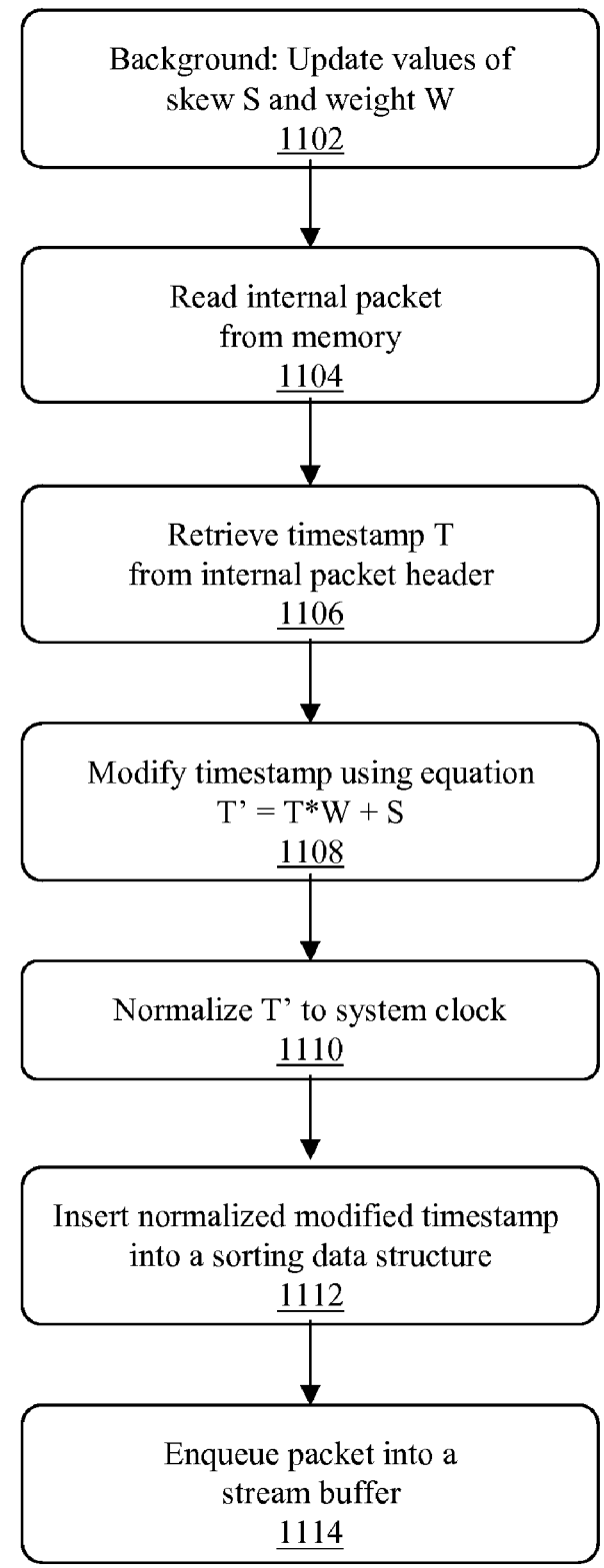
FIG. 11 is a flowchart of an exemplary method for canonical scheduling and delivery processing.

FIG. 11 illustrates an exemplary method 1100 for canonical scheduling and delivery processing, as conducted by the system 300. For each outgoing stream, the skew adjustment (S) and the weight adjustment (W) are updated (1102) in the background by, for example, the system 300. As part of enqueue processing, the delivery processor 320 retrieves internal packets from storage (e.g., media storage 310a and/or transient memory 310b) and places them into a stream buffer, ready for transmission. The method for retrieving from storage can be any suitable storage retrieval scheme that ensures that the stream buffer does not underflow. The delivery processor 320 reads (1104) an internal packet header from the buffer. The timestamp scheduler 312 retrieves (1106) a timestamp (represented as T) from the internal packet header. The timestamp scheduler 312 then modifies the timestamp by determining and applying weight adjustment and/or skew adjustment values to the timestamp. For example, the scheduler 312 can modify the timestamp by multiplying the timestamp by the weight adjustment retrieved from the weight generator 318 and then adding the skew adjustment retrieved from the skew generator 316 (e.g., the equation $T'=T*W+S$). As described above, the weight adjustment may be set to reflect a desired speed up factor (e.g., burst factor) over the nominally encoded bit-rate, a desired slow down factor over the nominally encoded bit-rate, or to convert the nominal rate into an actual delivery rate. In some examples, the weight adjustment can change over time.

Continuing with FIG. 11, the timestamp scheduler 312 normalizes (1110) the modified timestamp (represented as T') to the system clock 314. The timestamp scheduler 312 inserts (1112) the normalized modified timestamp into a timestamp sorting data structure. In some alternative implementations, the computation of the normalized modified timestamp (and insertion into the data structure), for a packet, may be deferred until the transmittal of the previous packet of the same stream. This optimizes the data-structure by ensuring that at any given point in time, only one timestamp resides in the structure for each outgoing stream. Finally, the delivery processor 320 enqueues (1114) the packet into a stream buffer for transmission. The dequeue and delivery logic (not shown in the figure) consists of removing packets from the stream buffer, using the order imposed by the sorting data structure, and transmitting the packet in a JIT or EDF (or a combination) fashion.

Figure 12:
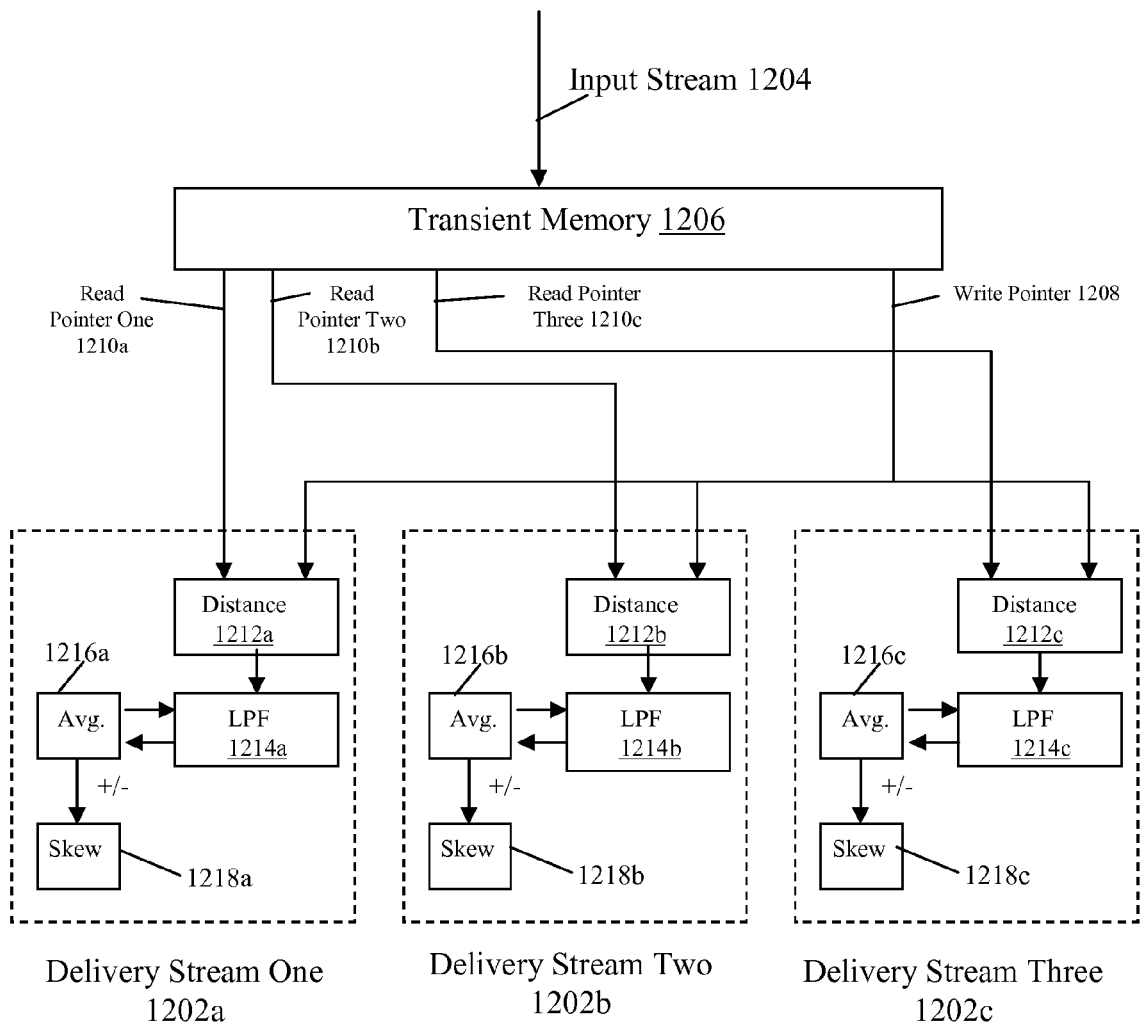
FIG. 12 is a block diagram of the background skew adjustment process.

FIG. 12 illustrates an exemplary block diagram for conducting the background skew adjustment process mentioned above (e.g. (S) of FIG. 11). The skew adjustment is made periodically (but generally not on a packet-by-packet basis) to provide clock synchronization with the content source. The correct adjustment is computed by observing the "write pointer" as internal packets 308 are ingested into memory and the "read pointer" of a stream, as packets are retrieved from memory. The skew is updated periodically so as to keep the moving average of the distance (in bytes) between the write and read pointers constant. For example, multiple delivery streams 1202a-c are sourced from a single input stream 1204 being ingested in real time into the transient memory 1206. The "write" pointer 1208 indicates the current ingest location, while the "read" pointers 1210a-c indicate the addresses from which internal packets 308 are currently being retrieved by the delivery processor 320, for each delivered stream 1202a-c. The distance between the respective pointer pairs 1212a-c are processed by a low-pass filter (LPF) 1214a-c to compute a moving average 1216a-c. If the moving average increases, the skew 1218a-c is incremented (starting with a value of 0), and if it decreases, the skew 1218a-c is decremented. The value of the skew 1218a-c eventually stabilizes to reflect the clock mismatch between the system clock 314 and the source clock of the content stream.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose circuitry. The circuitry can, for example, be a FPGA (field programmable gate array), an ASIC (application-specific integrated circuit), or the like. Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more computer readable storage devices for storing data (e.g., magnetic, magneto-optical disks, or optical disks).

Data transmission and instructions can also occur over a communications network. Information carriers suitable for embodying computer program instructions and data include computer readable storage mediums, for example all forms of non-volatile memory, including by way of example semiconductor memory devices. The computer readable storage mediums can, for example, be EPROM, EEPROM, flash memory devices, magnetic disks, internal hard disks, removable disks, magneto-optical disks, CD-ROM, and/or DVD-ROM disks. The processor and the memory can be supplemented by and/or incorporated in special purpose logic circuitry.

To provide for interaction with a user, the above described techniques can be implemented on a computer having a display device or a transmitting device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The computing device can include, for example, a computer, a computer with a browser device, a telephone, an IP phone, a mobile device (e.g., cellular phone, personal digital assistant (PDA) device, laptop computer, electronic mail device), a server, a rack with one or more processing cards, special purpose circuitry, and/or other communication devices. The browser device includes, for example, a computer (e.g., desktop computer, laptop computer) with a World Wide Web browser (e.g., Microsoft® Internet Explorer® available from Microsoft® Corporation, Mozilla® Firefox available from Mozilla® Corporation). The mobile computing device includes, for example, a Blackberry®.

The web servers can be, for example, a computer with a server module (e.g., Microsoft® Internet Information Services available from Microsoft® Corporation, Apache Web Server available from Apache Software Foundation, Apache Tomcat Web Server available from Apache Software Foundation).

The databases can be, for example, a computer with a server module (e.g., Microsoft® SQL Server 2008 available from Microsoft® Corporation and/or Oracle® Database 11 g available from Oracle® Corporation).

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network).

The system can include clients and servers. A client and a server are generally remote from each other and typically interact through a communication network. The relationship of client and server arises by virtue of computer programs running on the respective computers and having a client-server relationship to each other.

The above described communications networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A computerized method for scheduling of content streams, the method comprising:
    receiving, by an ingest processor, a content stream of bits from a network;
    preprocessing, by the ingest processor, the received content stream of bits, the preprocessing comprising:
        dividing the received content stream of bits into data packets,
        if the received content stream of bits includes timing information, assigning an internal timestamp to each data packet, wherein the internal timestamp is stored in the data packet independently from the timing information of the content stream,
        if the received content stream of bits does not include timing information, assigning an internal timestamp to each data packet, wherein the internal timestamp is stored in the data packet; and
    transmitting, by a delivery processor upon request from a receiver, the preprocessed content stream of bits, the transmitting comprising:
        establishing a delivery timestamp for each data packet in the preprocessed content stream of bits based on the assigned internal timestamp stored in the data packet,
        scheduling the data packets for transmission based on the delivery timestamp, and
        transmitting the data packets based on a schedule generated during the scheduling step.

2. The method of claim 1, wherein the received content stream of bits is of type RTP, MPEG-2 transport stream, Adobe RTMP, Interleaved RTSP, FTP, or HTTP.

3. The method of claim 1, wherein the dividing step comprises:
    determining a packet size based on the type of the received content stream of bits, the network packetization of the received content stream of bits, the maximum transmission unit of the transmitted data packets, or any combination thereof; and
    mapping the received content stream of bits to data packets based on the packet size.

4. The method of claim 1, wherein assigning an internal timestamp to each data packet includes:
    normalizing the internal timestamp according to a controlled time value; and
    inserting the normalized internal timestamp into the packet header of the data packet.

5. The method of claim 4, wherein normalizing the internal timestamp includes:
    modifying the internal timestamp based on a frequency of the controlled time value, a frequency associated with the internal timestamp, or both; and
    adjusting the bit length of the internal timestamp to match a predetermined bit length.

6. The method of claim 4, wherein the received content stream of bits includes network timestamp information, the method further comprising:
    identifying a network timestamp in the content stream and generating the internal timestamp based on the network timestamp.

7. The method of claim 4, wherein the received content stream of bits includes network timestamp information, the method further comprising:

identifying a first network timestamp and a second network timestamp in the received content stream of bits;
determining a difference between the first network timestamp and the second network timestamp; and
generating the internal timestamp based on the difference.

8. The method of claim 4, wherein the received content stream of bits includes embedded timestamp information, the method further comprising:
identifying a first embedded timestamp and a second embedded timestamp in the received content stream of bits;
determining a difference between the first embedded timestamp and the second embedded timestamp; and
generating the internal timestamp based on the difference.

9. The method of claim 4, wherein the received content stream of bits includes a bit-rate, the method further comprising:
determining a packet interval based on a packet size of the data packet and the bit-rate; and
generating the internal timestamp based on the packet interval.

10. The method of claim 4, wherein the received content stream of bits does not include embedded timing information or a bit-rate, the method further comprising:
determining a packet interval based on a packet size of the data packet and a preselected bit-rate; and
generating the internal timestamp based on the packet interval.

11. The method of claim 4, wherein the controlled time value is a system clock.

12. The method of claim 11, wherein the method further comprises:
generating the internal timestamp based on the system clock at the arriving time of the received content stream of bits.

13. The method of claim 11, wherein the system clock is based on a network timing protocol.

14. The method of claim 1, wherein establishing the delivery timestamp is based on modifying the assigned internal timestamp.

15. The method of claim 14, wherein modifying the assigned internal timestamp comprises:
determining a weight adjustment value for each data packet; and
applying the weight adjustment value to the internal timestamp of the data packet.

16. The method of claim 15, wherein the weight adjustment value is based on a speed up factor, a slow down factor, a delivery rate, or any combination thereof.

17. The method of claim 16, wherein the weight adjustment value changes over time.

18. The method of claim 14, wherein modifying the assigned internal timestamp comprises:
determining a skew adjustment value for each data packet; and
applying the skew adjustment value to the internal timestamp of the data packet.

19. The method of claim 18, wherein the skew adjustment value is based on a difference between receipt of each data packet into a memory device and retrieval of each data packet from the memory device.

20. The method of claim 1, wherein establishing the delivery timestamp is based on using the assigned internal timestamp without any modifications.

21. The method of claim 1, wherein scheduling the data packets for transmission includes:
normalizing the delivery timestamp to a controlled time value;
inserting the normalized delivery timestamp into a data structure; and
sorting the data structure based on the normalized delivery timestamp.

22. The method of claim 1, wherein transmitting the data packets based on a schedule includes mapping the data packets into network packets.

23. The method of claim 1, wherein preprocessing the received content stream of bits includes assigning a third timestamp to each data packet, wherein the third timestamp is stored in the data packet independently from the timing information of the content stream and independently from the internal timestamp.

24. A computerized method for scheduling of content streams, the method comprising:
receiving, by an ingest processor, a first content stream of bits and a second content stream of bits from a network;
dividing, by the ingest processor, the first content stream of bits into data packets based on a format of the first content stream of bits;
dividing, by the ingest processor, the second content stream of bits into data packets based on a format of the second content stream of bits;
if the first content stream of bits includes timing information, assigning an internal timestamp to each data packet, wherein the internal timestamp is stored in the data packet independently from the timing information of the content stream,
if the first content stream of bits does not include timing information, assigning an internal timestamp to each data packet, wherein the internal timestamp is stored in the data packet;
if the second content stream of bits includes timing information, assigning an internal timestamp to each data packet, wherein the internal timestamp is stored in the data packet independently from the timing information of the content stream,
if the second content stream of bits does not include timing information, assigning an internal timestamp to each data packet, wherein the internal timestamp is stored in the data packet; and
storing, by the ingest processor, the data packets in a storage device;
retrieving, by a delivery processor, the data packets from the storage device;
establishing, by the delivery processor, a delivery timestamp for each data packet in the first content stream of bits based on the assigned internal timestamp stored in the data packet;
scheduling, by the delivery processor, the data packets for transmission based on the delivery timestamp, and
transmitting, by the delivery processor, the data packets based on a schedule generated during the scheduling step.

25. A computer program product, tangibly embodied in a non-transitory machine-readable storage device, for scheduling of content streams, the computer program product including instructions operable to cause a data processing apparatus to:
receive a content stream of bits from a network;
preprocess the received content stream of bits, the preprocessing comprising:
dividing the received content stream of bits into data packets, if the received content stream of bits includes timing information, assigning an internal timestamp to each data packet, wherein the internal timestamp is stored in the data packet independently from the timing information of the content stream, if the received content stream of bits does not include timing information, assigning an internal timestamp to each data packet, wherein the internal timestamp is stored in the data packet; and transmit, upon request from a receiver, the preprocessed content stream of bits, the transmitting comprising:

establishing a delivery timestamp for each data packet in the preprocessed content stream of bits based on the assigned internal timestamp stored in the data packet, scheduling the data packets for transmission based on the delivery timestamp, and transmitting the data packets based on a schedule generated during the scheduling step.

26. A system for scheduling of content streams, the system comprising:

an ingest processor configured to:

receive a content stream of bits from a network, divide the content stream of bits into data packets, if the received content stream of bits includes timing information, assign an internal timestamp to each data packet, wherein the internal timestamp is stored in the data packet independently from the timing information of the content stream, if the received content stream of bits does not include timing information, assigning an internal timestamp to each data packet, wherein the internal timestamp is stored in the data packet; and a delivery processor configured to:

establish a delivery timestamp for each data packet in the preprocessed content stream of bits based on the assigned internal timestamp stored in the data packet, schedule the data packets for transmission based on the delivery timestamp, and transmit the data packets based on a schedule generated during the scheduling step.

* * * * *